United States Patent
Cobb, Jr. et al.

[11] Patent Number: 6,052,164
[45] Date of Patent: Apr. 18, 2000

[54] ELECTROLUMINESCENT DISPLAY WITH BRIGHTNESS ENHANCEMENT

[75] Inventors: Sanford Cobb, Jr., Saint Mary's Point; John F. Dreyer, North Oaks, both of Minn.

[73] Assignee: 3M Innovative Properties Company, St. Paul, Minn.

[21] Appl. No.: 08/024,610

[22] Filed: Mar. 1, 1993

[51] Int. Cl.[7] .................................................. G02F 1/1335
[52] U.S. Cl. ............................ 349/64; 349/69; 362/339; 362/84
[58] Field of Search .............................. 362/84, 330, 331, 362/339; 359/50, 69, 362; 349/64, 69, 112

[56] References Cited

U.S. PATENT DOCUMENTS

| | | | |
|---|---|---|---|
| 4,542,449 | 9/1985 | Whitehead | 362/330 |
| 4,563,613 | 1/1986 | Genovese et al. | 313/497 |
| 4,748,546 | 5/1988 | Ukrainsky | 359/50 |
| 4,791,540 | 12/1988 | Dreyer, Jr et al. | 362/331 |
| 4,883,341 | 11/1989 | Whitehead | 350/276 R |
| 4,902,929 | 2/1990 | Toyoda et al. | 313/503 |
| 4,952,023 | 8/1990 | Bradshaw et al. | 350/102 |
| 5,056,892 | 10/1991 | Cobb, Jr. | 359/831 |
| 5,131,877 | 7/1992 | Mathumoto | 313/503 |
| 5,247,226 | 9/1993 | Sato et al. | 313/504 |
| 5,262,880 | 11/1993 | Abileah | 359/69 |
| 5,280,371 | 1/1994 | McCartney, Jr. et al. | 359/69 |
| 5,281,489 | 1/1994 | Mori et al. | 428/690 |
| 5,304,895 | 4/1994 | Ujihara | 315/72 |
| 5,306,441 | 4/1994 | Reddy et al. | 252/301.4 F |

OTHER PUBLICATIONS

3M Instruction Sheet No. 78–8063–2625–8, Instructions for Field Change, for 3M–IR–Compatible Safelight Kit, IFC No.: 831/952–20, Jan. 1989, pp. 1 through 7.

3M IR Safelight, Medical Imaging Systems, Imaging Systems Group, 3M Health Care, St. Paul, Minnesota, 1991, pp. 1 and 2.

McCartne et al., p 91 "S7–7 Directional Diffuser Lens Array for Backlit LCDs" Japan Display, 1992, pp 259–262.

*Primary Examiner*—Kenneth Parker
*Attorney, Agent, or Firm*—Stephen W. Buckingham

[57] ABSTRACT

A backlight display includes a case having an optical window through which displayed information may be viewed. In addition it includes an electroluminescent panel for providing the backlight. It further includes a structured surface material between the electroluminescent panel and the optical window. The structured surface material has the property of reflecting light entering it while making an angle in a first predetermined group of angles with the axis of the display back to the electroluminescent panel. It further has the property of refracting light entering it while making an angle in a second predetermined group of angles to the axis of the display such that a majority of the light in the second group will exit in an output wedge that is smaller than the input wedge.

10 Claims, 3 Drawing Sheets

ELECTROLUMINESCENT DISPLAY WITH BRIGHTNESS ENHANCEMENT

BACKGROUND OF THE INVENTION

A wide variety of illuminated electronic displays are currently in common use. Perhaps the most familiar of such displays are cathode ray tubes (CRT's). CRT's are popular because they have many advantages. They produce bright, high resolution, color images. They do, however, have significant disadvantages in certain situations. Compared with alternatives such as liquid crystal displays (LCD's) and electroluminescent displays (ELD's) they are bulky and consume large quantities of power. In contrast, LCD's are much thinner and consume much less power. This makes LCD's preferable for applications where space or energy consumption is important. Examples of applications where such considerations are important are lap-top computers, where both energy consumption and space are critical, and automobile dashboard displays, where the volume is of particular importance.

Because LCD's are not light emitting, they require a light source. Although they may use ambient light, an internal light source typically placed behind the display usually provides greater readability, especially in a dark environment. As a result, there is a minimum thickness necessitated by the illumination source.

An alternative type of display is electroluminescent. In an electroluminescent display, electroluminescent materials may be used as a light source for another type of display, such as an LCD, or may be both the light source and the display itself. Electroluminescent displays have the advantage of being thin, cool, and highly efficient. One problem with electroluminescent displays, however, is a lack of brightness. This is often overcome by increasing the voltage applied to the electroluminescent material. While this will increase the brightness of the display, it reduces the display's reliability and lifetime.

A second problem with electroluminescent displays is that they are inherently grainy in appearance. This graininess reduces readability and increases operator fatigue especially when such displays are used for extended periods of time. The increase of voltage that will produce brighter intensity still does little or nothing to overcome the problem of the grainy appearance.

SUMMARY OF THE INVENTION

According to the present invention backlit display includes a case having an optical window through which displayed information may be viewed. In addition it includes an electroluminescent panel for providing the backlight. It further includes a structured surface material between the electroluminescent panel and the optical window. The structured surface material has the property of reflecting light entering it while making an angle in a first predetermined group of angles with the axis of the display back to the electroluminescent panel. It further has the property of refracting light entering it while making an angle in a second predetermined group of angles to the axis of the display such that a majority of the light in the second group will exit in an output wedge that is smaller than the input wedge. The invention provides the expected result of increasing the apparent on-axis brightness of the display but also provides the unexpected result of alleviating the inherent graininess of the electroluminescent light sources.

DETAILED DESCRIPTION OF THE PREFERRED EMBODIMENTS

The present invention relies on the known phenomenon that certain types of structured surface materials will, when accepting light from a lambertian, area source, increase the apparent on-axis brightness of the source by reducing the size of the wedge of emitted light. It has been found that when such a source is used in conjunction with an electroluminescent light source, it has the unexpected result of also significantly reducing, or even eliminating the graininess normally inherent in an electroluminescent light source.

Figure 1:
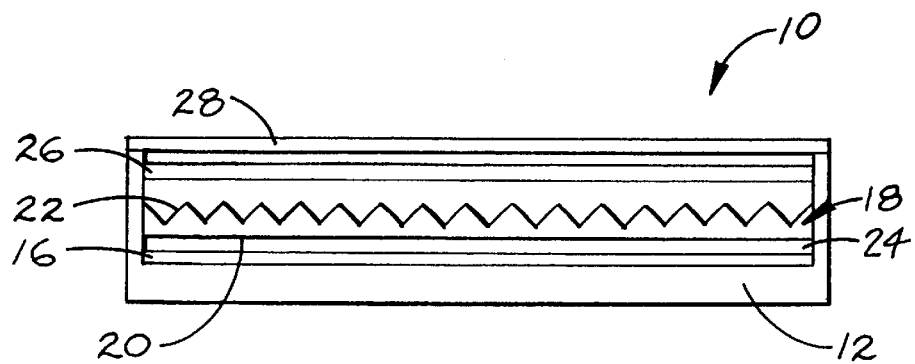
FIG. 1 shows a first embodiment of the invention.

FIG. 1 illustrates a first embodiment of a display, 10, according to the invention. Display 10 includes a case 12. Display 10 includes an electroluminescent panel 16 and a structured surface material 18. Electroluminescent panel 16 includes an electroluminescent material and a reflector behind the electroluminescent material. The reflective material, in this embodiment, is preferably a diffuse reflector. Electroluminescent panel 16 is described in more detail below.

Structured surface material 18 has a smooth surface 20 and a structured surface 22. Smooth surface 20 lies toward the back of display 10 and structured surface 22 lies toward the front. To insure that they are not optically coupled, electroluminescent panel 16 and structured surface material 18 are preferably separated by a small air gap 24. Structured surface material 18 and its operation in the invention will be described in greater detail in conjunction with FIGS. 2 and 3.

Display 10 further includes a light gating device 26. Typically light gating device 26 is a liquid crystal display. As is well known in the art, a liquid crystal display may be made transparent or opaque, in the case of a monochrome display, or transparent or a variety of colors in the case of a color display by the proper application of electrical signals. This will form images that will be visible when electroluminescent display is illuminated. Display 10 further includes a transparent cover sheet 28.

Figure 2:
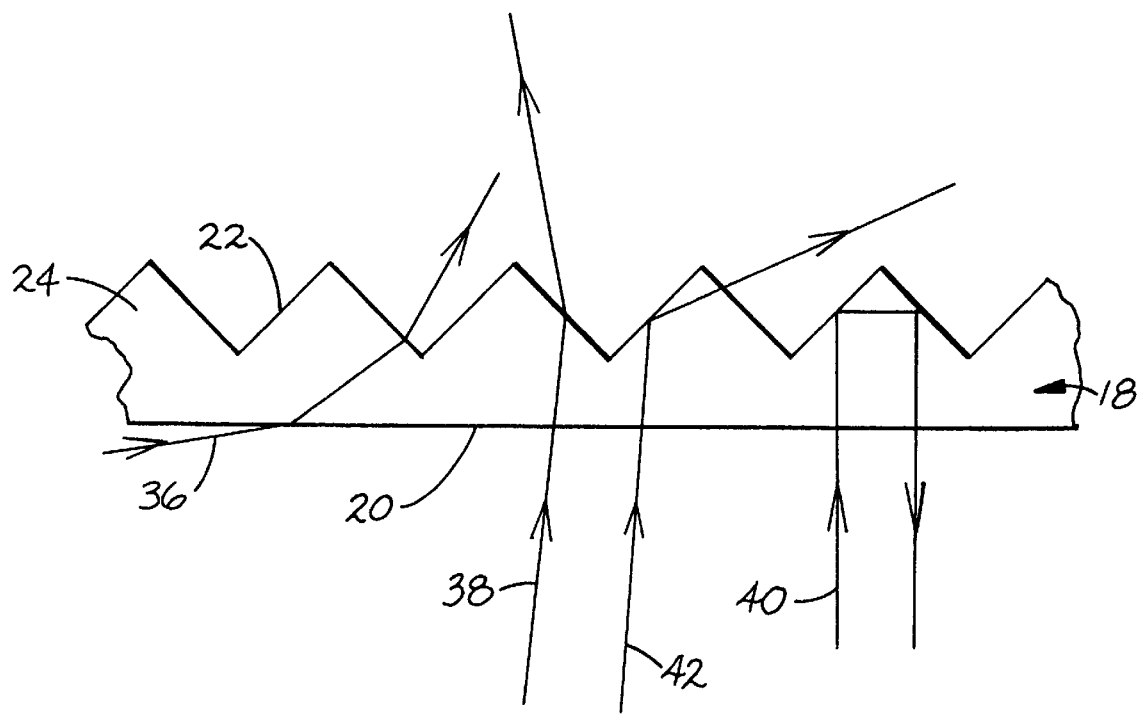
FIG. 2 shows the operation of the structured surface material used in the invention.

FIG. 2 is an enlargement of structured surface material 18 of FIG. 1. As described previously, structured surface material 18 has a smooth side 20 and a structured side 22. Structured side 22, in the preferred embodiment, includes a plurality of triangular prisms. In the preferred embodiment, such prisms are right isosceles prisms, although prisms having peak angles in the range of 70 degrees to 110 degrees will work with varying degrees of effectiveness with the invention. Structured surface material 18 may be of any transparent material having an index of refraction greater than that of air, but, in general, the materials with higher indices of refraction will produce better results. Polycarbonate, which has an index of refraction of 1.586, has proven to work very effectively. For purposes of description of the invention, the prisms on structured surface 22 will be assumed to have included angles of 90 degrees and structured surface material 18 will be assumed to be of polycarbonate. Alternatively other structured surface materials may be used. Symmetric cube corner sheeting has been shown to produce excellent results.

Figure 3:
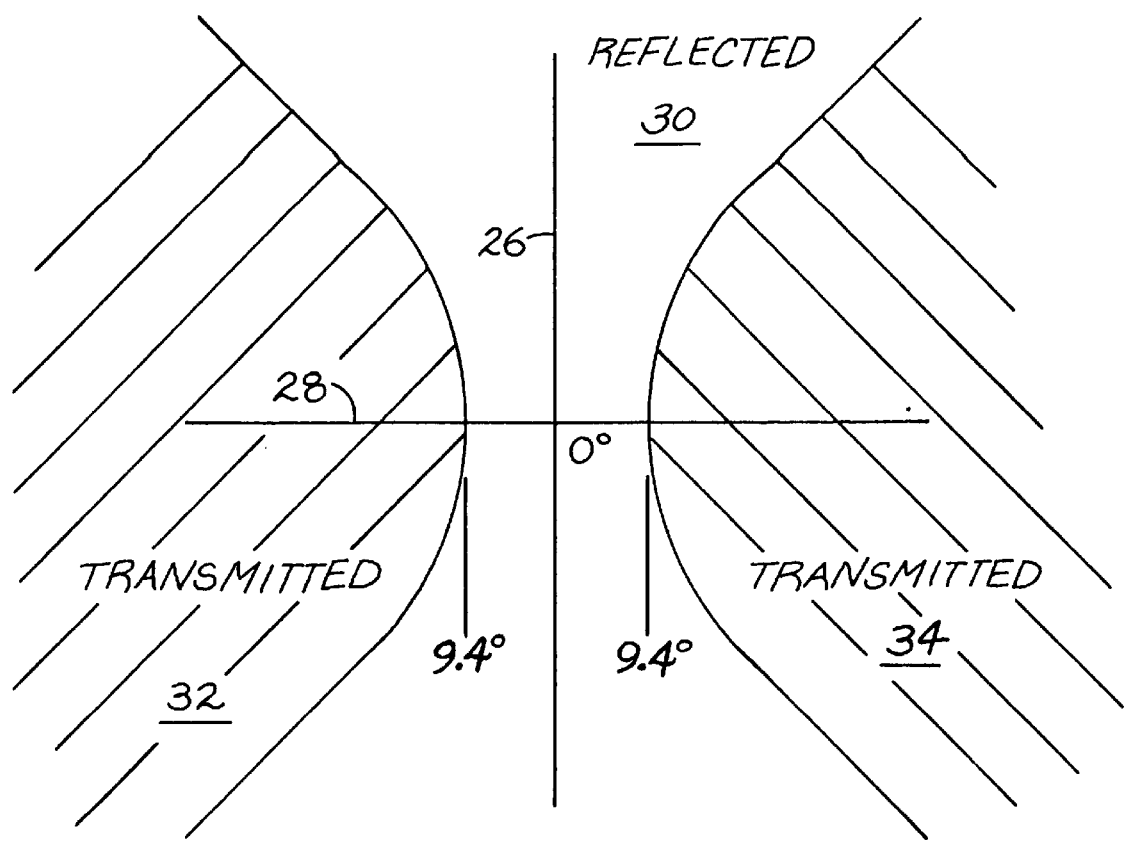
FIG. 3 is a graph of the operation of the structured surface material used in the invention.

FIG. 3 illustrates the operation of structured surface material 18. FIG. 3 is a graph having two axes 26 and 28. These axes represent the angle that a light ray makes to a normal to smooth surface 20. Specifically, axis 26 represents the angle that the light ray makes when the direction of the light ray is projected into a plane parallel to the linear extent of the structures on structured surface 22. Similarly axis 28 represents the angle that the light ray makes to a normal to smooth surface 20 when the direction of the light ray is projected into a plane perpendicular to the linear extent of the structures on structured surface 22. Thus a light ray striking perpendicular to smooth surface 20 would be represented by the origin, labeled 0 degrees, of the graph of FIG. 3. As may be seen, FIG. 3 is divided into regions 30, 32, and 34. Light striking at angles that fall within region 30 will enter structured surface material 18 but be totally internally reflected by structured surface 22 so that they pass through smooth surface 20 a second time and reenter air gap 24. Light rays striking smooth surface 20 at an angle such that they fall in region 32 or 34 will be transmitted but refracted to a different angle with respect to the normal. As may be seen from FIG. 3, which represents the performance of polycarbonate, any light ray striking smooth surface 20 at an angle of less than 9.4 degrees to the normal, will be reflected.

Returning to FIG. 2, four exemplary light rays are shown. The first, light ray 36, approaches smooth surface 20 at a grazing angle, i.e., an angle to the normal approaching 90 degrees. If light ray 36 makes an angle of 89.9 degrees to the normal to surface 20 when it strikes structured surface material 18, it will be refracted such that it makes an angle of 39.1 degrees to the normal as it travels through structured surface material 18. Upon reaching structured surface 22, it will be refracted again. Because of the structures on structured surface 22, it will be refracted so that again it will make a smaller angle to the normal to structured surface 20. In the example it will make an angle of 35.6 degrees.

Light ray 38 approaches smooth surface 20 at an angle much closer to the cut off angle. It also is refracted as it passes through smooth surface 20, but to a lesser extent. If light ray 38 approaches smooth surface 20 at an angle of 10 degrees to the normal to smooth surface 20, it will emerge from structured surface 22 at an angle of 37.7 degrees to the normal to smooth surface 20 but on the opposite side of that normal.

Light ray 40 approaches at an angle less than the cut off angle and is totally internally reflected twice by structured surface 22 and returned to the interior of display 10.

Finally, light ray 42 approaches smooth surface 20 at an angle similar to that of light ray 38, but in a location such that it is totally internally reflected by one side of a prism on structured surface 22 but not by the second side. As a result it emerges at a large angle to the normal to smooth surface 20. Because such a reflection only occurs to a light ray that is travelling in a direction that forms a high incidence angle to the side it strikes, the prisms provide a very small cross section to such rays. In addition many of those rays will reenter the next prism and be returned into display 10.

A fifth class of light ray is not shown in FIG. 2. This is the set of light rays that are reflected by smooth surface 20 and do not enter structured surface material 18. Such light rays simply join the others that are reflected back into display 10.

As may be seen from this discussion, light that, absent structured surface material 18, would have emerged from the display at a high angle to the axis of the display, where the axis of the display is taken to be the normal to smooth surface 20, is redirected into a direction closer to that axis. A small amount of light will be directed out at a large angle to the axis. Thus, we may say that light that enters structured surface material 18 through smooth surface 20 with an angle of incidence greater than a predetermined angle is directed into an output wedge that is narrower than the input wedge and the majority of the light that enters structured surface material 18 through smooth surface 20 at an angle of incidence of less than that predetermined angle will be reflected back into display 10.

The light that is reflected back into display 10 will strike electroluminescent panel 16. In general, most of the light that strikes electroluminescent panel 16 will be diffusely reflected either by the electroluminescent material itself or by the reflector behind it. Then it will travel back to structured surface material 18, in general making a different angle than it made the first time. The process is then repeated so that more of the light is redirected into the smaller wedge. The key aspect of the invention is that structured surface material 18 must be capable of reflecting light striking it in a first predetermined group of angles and passing, but refracting, light striking it in a second predetermined group of angles wherein the angles in the second group of angles are greater than those in the first group of angles and wherein the light in the second group of angles is refracted into an output wedge that is narrower than its input wedge.

Figure 4:
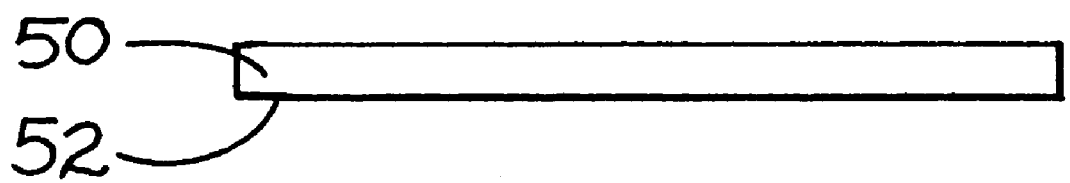
FIG. 4 shows the construction of an electroluminescent panel that may be used in the invention.
Figure 4:
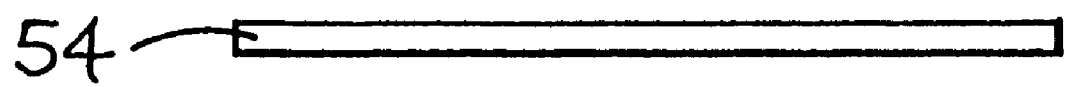
Figure 4:
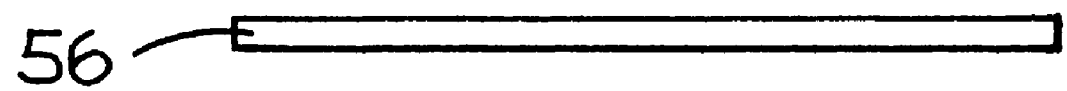
Figure 4:
Figure 4:
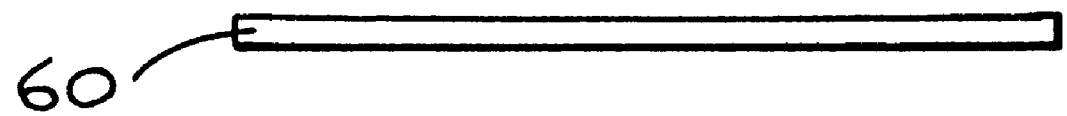

FIG. 4 is an exploded view of an electroluminescent panel that could be used with the present invention. Such electroluminescent panels are available from Durel Corporation under the trade name Durel 3. The electroluminescent panel of FIG. 4 includes a transparent front insulator 50 that provides electrical insulation and protection to the electroluminescent system. Front insulator 50 may be, for example, of polyester. An electrically conductive material, 52, is applied to one surface of front insulator 50. Electrically conductive layer 52 is preferably made very thin so as to be essentially transparent. Beneath electrically conductive layer 52 is the electroluminescent material 54. Underlying electroluminescent material 54 is a dielectric layer 56. Dielectric layer 56 acts as the reflector behind the electroluminescent material as discussed previously. Dielectric layer 56 is preferably a diffuse reflector. Underlying dielectric material 56 is rear electrode 58. Finally, rear insulator 60 provides electrical insulation and physical protection to the rear of the electroluminescent panel.

Figure 5:
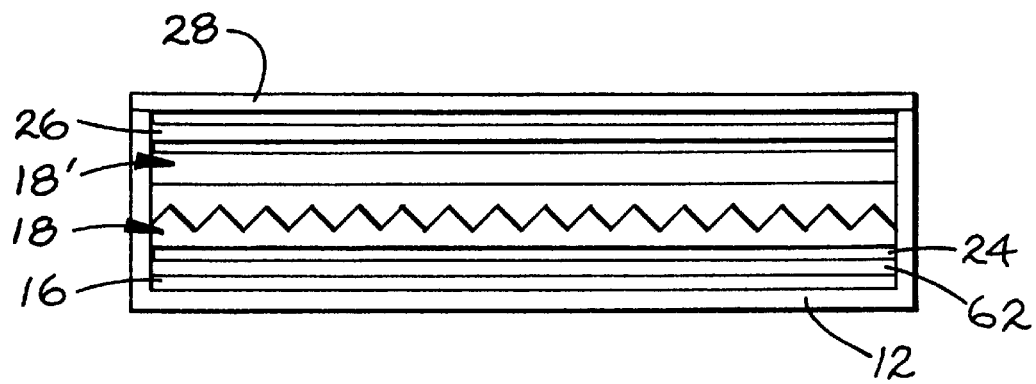
FIG. 5 shows a second embodiment of the invention.

FIG. 5 illustrates a second embodiment of the invention. The embodiment of FIG. 5 is essentially the same as that of FIG. 4 with two modifications. The first modification is the addition of a second structured surface film, 18'. Structured surface film 18' is typically identical to structured film 18 except that the structures run perpendicular to those of film 18. The second change is the addition of a diffuser 62. By including a diffuser 62 it is possible to make reflector 56 of FIG. 4 a specular reflector instead of a diffuse reflector. Diffuser 62 then provides the randomization of the direction of the light making possible the function of the invention.

What is claimed is:

1. A backlit display comprising:
   a case having an optical window and an axis;
   an electroluminescent panel in said case;
   a structured surface material between said electroluminescent panel and said optical window, said structured surface material having the property that light entering it while making an angle in a first predetermined group of angles with said axis will be reflected and light entering it while making an angle in a second predetermined group of angles with said axis will be refracted such that the majority of the light in said second group of angles will form an output wedge that is narrow than said output wedge's associated input wedge, said angles in said second group of angles being greater than said angles in said first group of angles; and a light gating means between said structured surface material and said optical window.

2. The backlit display of claim 1 wherein said light gating means is a liquid crystal display.

3. The backlit display of claim 1 wherein said structured surface material has a smooth surface and a structured surface, said structured surface having thereon a plurality of triangular prisms.

4. The backlit display of claim 3 wherein said triangular prisms have included angles in the range of 70 degrees to 110 degrees.

5. The backlit display of claim 4 wherein said triangular prisms have included angles substantially equal to 90 degrees.

6. The backlit display of claim 1 further comprising a diffuser between said electroluminescent panel and said structured surface material.

7. The backlit display of claim 1 further comprising a second structured surface material between said electroluminescent panel and said optical window, said second structured surface material having the property that light entering it while making an angle in a first predetermined group of angles with said axis will be reflected and light entering it while making an angle in a second predetermined group of angles with said axis will be refracted such that the majority of the light in said second group of angles will form a second output wedge that is narrower than said second output wedge's associated input wedge, said angles in said second group of angles being greater than said angles in said first group of angles.

8. The backlit display of claim 7 wherein each of said structured surface materials has a smooth side and a structured side, said structured sides having a plurality of triangular prisms thereon.

9. The backlit display of claim 7 wherein said triangular prisms have included angles in the range of 70 degrees to 110 degrees.

10. The backlit display of claim 9 wherein said triangular prisms have included angles substantially equal to 90 degrees.

* * * * *